Oct. 6, 1959           E. COOK           2,907,394
AGRICULTURAL IMPLEMENTS HAVING RESILIENT DRAFT CONNECTIONS
Filed Sept. 17, 1956           4 Sheets-Sheet 2
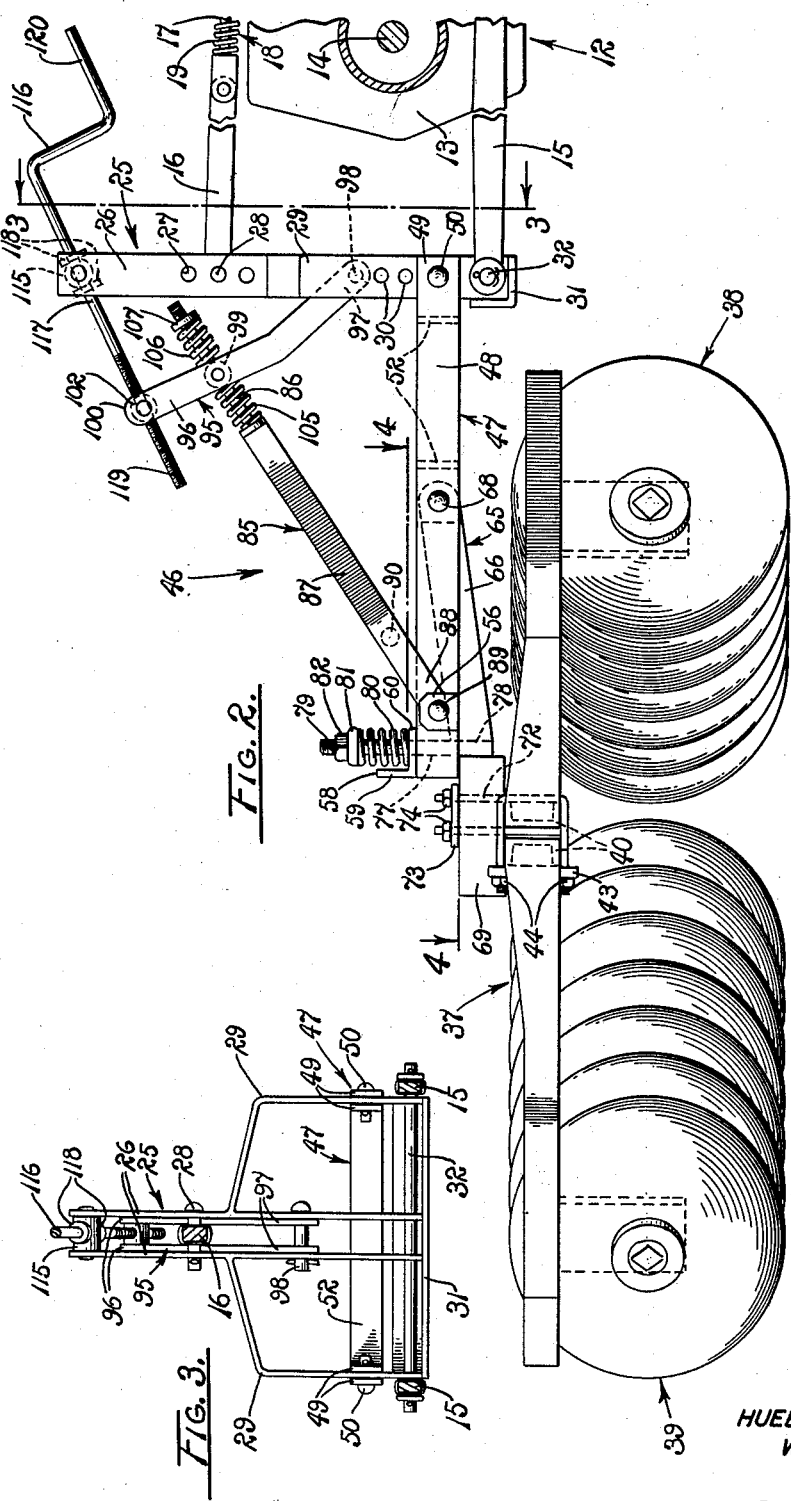
EINAR COOK
INVENTOR
HUEBNER, BEEHLER,
WORREL & HERZIG
ATTORNEYS

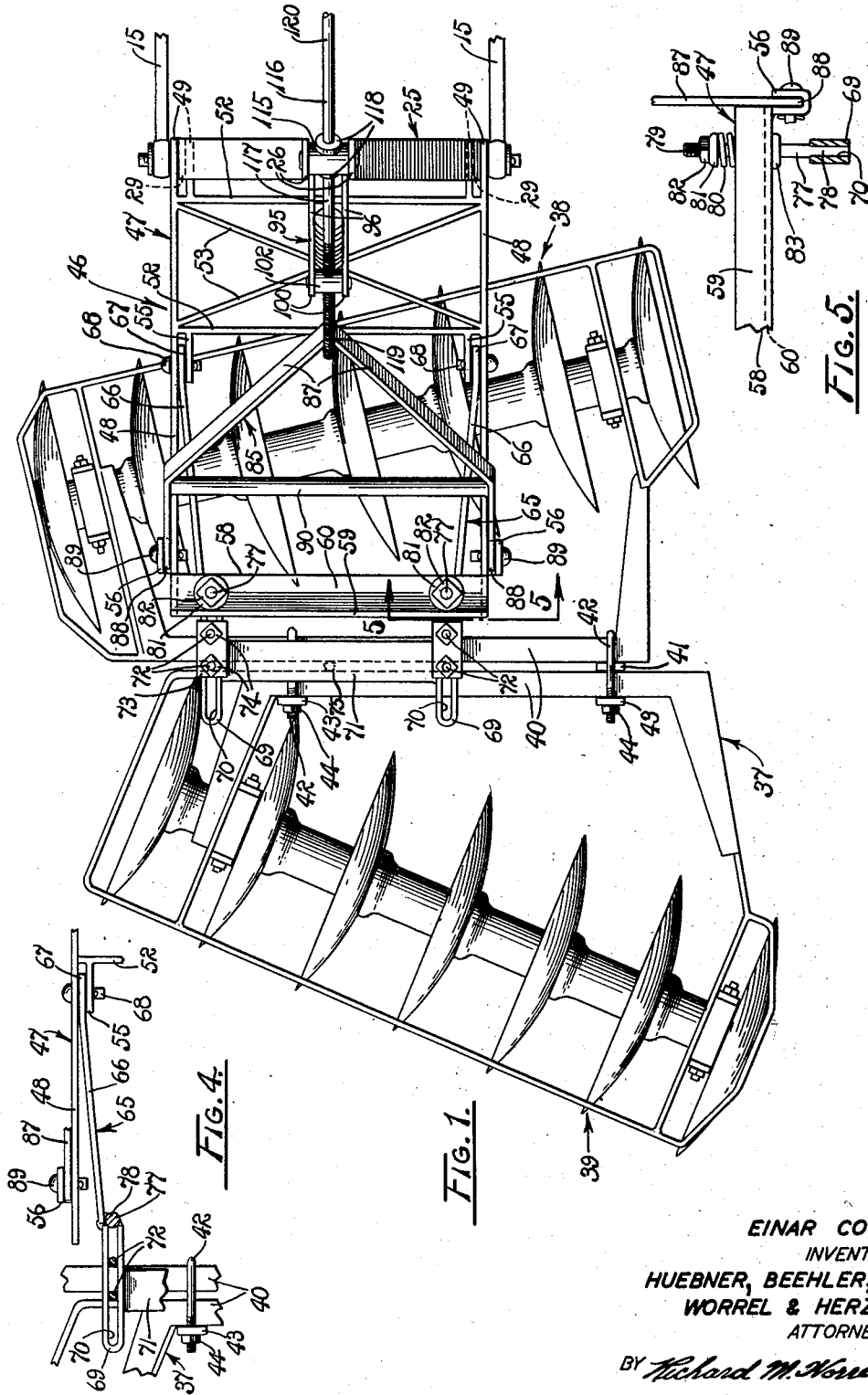

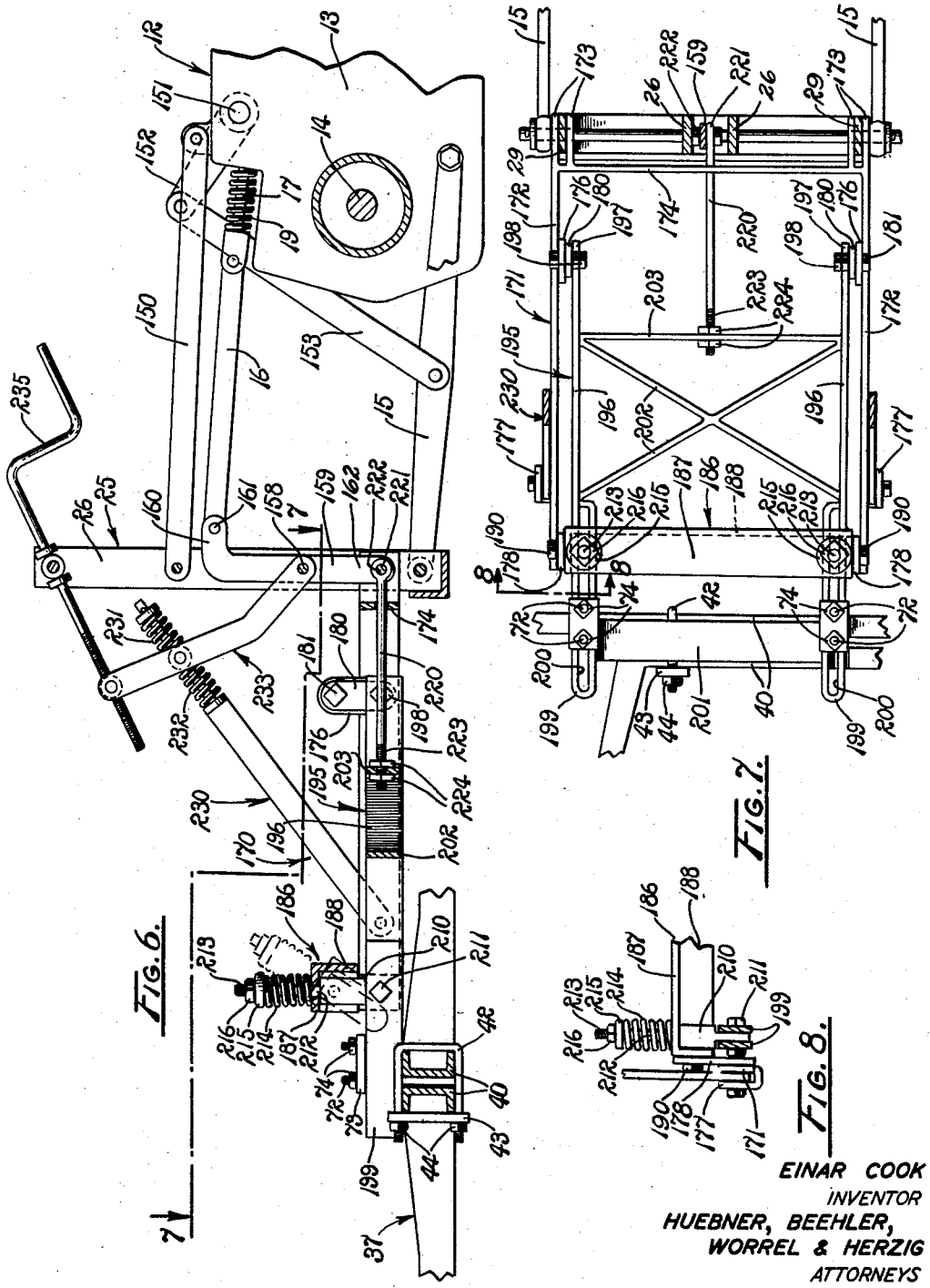

United States Patent Office 2,907,394
Patented Oct. 6, 1959

2,907,394
AGRICULTURAL IMPLEMENTS HAVING
RESILIENT DRAFT CONNECTIONS
Einar Cook, Clovis, Calif.
Application September 17, 1956, Serial No. 610,178
13 Claims. (Cl. 172—7)

The present invention relates to agricultural implements and more particularly to such implements having resilient draft connections for coupling the implements to tractors and other draft appliances.

The desirability of automatically controlling the depth of earth engagement of agricultural implements connected to tractors has led to the popularity of various, hydraulically actuated systems provided for the purpose. Such systems may be typified by reference to the Ferguson Patent No. 2,118,180 and to other systems in the art which are referred to as providing "three point" and "four point" connections. Generally speaking, they utilize a pair of lift arms which are rearwardly extended from the tractor on which they are mounted, an A-frame pivotally mounted in an erect position on the rearward ends of the lift arms and rigidly or pivotally connected to an implement to be used in conjunction with the tractor, an hydraulic system powered by the tractor connected in controlling relation to the lift arms, a control mechanism for the hydraulic system, and a control linkage interconnecting the implement and the control mechanism. The control linkages are many and varied in form but usually actuate their associated systems to raise the arms when the implements exert an excessive resistance to movement and lower the lift arms when the resistance to movement is less than a predetermined amount. Additionally, such systems are conventionally provided with manual controls whereby the implements can be raised to transport position free of the ground and lowered to desired earth working depth in accordance with operator-expressed preference.

While successful for their intended purposes, the systems to which reference has been made have been subject to certain disadvantages which the present invention seeks to overcome. When suddenly lifting implements from the soil and equally suddenly dropping them into earth engagement, the implements, tractors and systems have been subject to excessive stresses and strains productive of excessive wear, breakage and general deterioration. During operation they have not possessed the desired resilient accommodation to operating conditions. On many occasions they provide a false sensing of operational requirements so that the systems are operated in other than an optimum manner.

Accordingly it is an object of the present invention to provide a improved resilience in couplings for connecting implements and the like to tractors which make provision for raising and lowering the implements on the tractors.

Another object is to provide a cushioned support for implements on tractors which is operable with the implements elevated to transport position and lowered into earth engagement.

Another object is to provide an improved implement supporting structure in implement connections of the character described which is conducive to more accurate automatic control.

Another object is to minimize the shock, wear, breakage and general deterioration in tractor-implement couplings and especially in those providing elevational control of the implements.

A further object is to provide an improved control linkage for three and four point connections of the general character to which reference has been made.

Other objects and advantages are to provide tractor-implement connections having elevational control which are simple and economical to construct, durable in form, dependable in action, adapted to a variety of implements and tractors, and which are highly effective for accomplishing their intended purposes.

Additional objects and advantages will become apparent in the subsequent description in the specification.

In the drawings:

Fig. 1 is a top plan view of an implement and an implement coupling device as provided by the present invention.

Fig. 2 is a side elevation of the implement and coupling device of Fig. 1 and also of the rear end of a tractor to which the coupling device is connected, the tractor being only fragmentarily shown.

Fig. 3 is a vertical section taken on line 3—3 of Fig. 2.

Fig. 4 is a fragmentary, horizontal section taken on line 4—4 of Fig. 2.

Fig. 5 is a fragmentary vertical section taken on line 5—5 of Fig. 1.

Fig. 6 is a fragmentary, vertical section taken through an implement and a tractor and showing a second form of implement coupling device interconnecting the implement and the tractor.

Fig. 7 is a horizontal cross section taken on a plane at a position indicated by line 7—7 of Fig. 6.

Fig. 8 is a fragmentary, vertical section taken on line 8—8 of Fig. 7.

Figure 9:
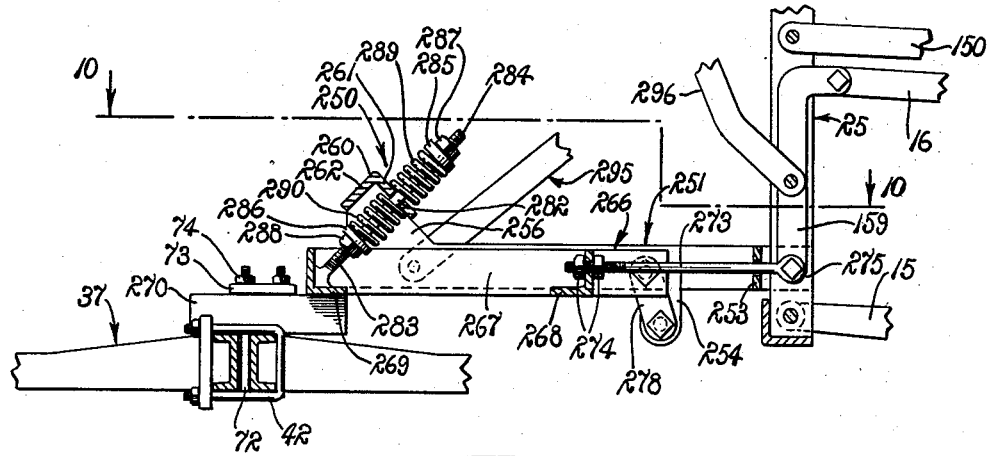
Fig. 9 is a fragmentary, vertical section taken through an implement, and the rearward portion of a tractor and showing a third form of an implement coupling device for interconnecting the implement and the tractor.
Figure 10:
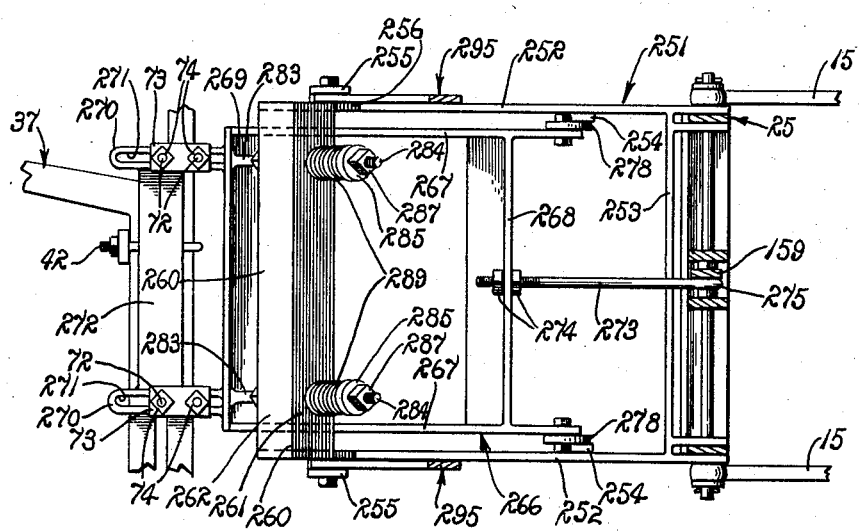
Fig. 10 is a fragmentary, horizontal section taken on a plane at a position indicated by line 10—10 of Fig. 9.

Referring more particularly to the drawings, a tractor 12 is fragmentarily illustrated in Fig. 2 and includes a rear transmission housing 13 and an axle 14 adapted to be supported on ground engaging wheels, not shown, for the tractor. A pair of lift arms 15 provide forward ends pivotally connected to the tractor for elevational adjustable movement and rearwardly extended ends. An upper control link 16 is pivotally connected to a plunger 17 adapted to control an hydraulically powered control system 18 for raising and lowering the lift arms. The control link and plunger are mounted for forward and rearward movement in the tractor and a plunger spring 18 encircling the plunger yieldably urges the plunger and control link rearwardly. As is well-known in the art, the control system is adapted automatically to operate an hydraulic power unit, not shown, to raise the lift arms incident to movement of the control link forwardly of a predetermined neutral position and to lower the lift arms incident to movement of the control link rearwardly of a predetermined position.

A substantially erect, A-shaped lift frame 25 provides a pair of upright, spaced, parallel center plates 26 having a plurality of upper apertures 27. The control link is pivotally connected between the center plates by means of a pin 28 extended through corresponding apertures in the center plates and through the control link. Angulated side bars 29 are extended outwardly and downwardly of the center plates and provide lower bores 30. An angle bar 31 interconnects the lower ends of the side bars, and an elongated shaft 32 extends through the lower ends of the side bars and the center plates.

The rearward ends of the lift arms 15 are pivotally connected to the opposite ends of the shaft whereby the lift frame is mounted for elevationally adjustable movement on the control link and lift arms.

An offset disc harrow 37 constitutes a convenient implement for illustrating the use of the subject invention. The harrow provides front and rear framed gangs of discs 38 and 39. The gangs have horizontally disposed back-to-back channels 40 held in spaced parallel relation by spacer blocks 41 and rigidly, although releasably, interconnected by horizontal U-bolts 42 providing threaded legs extended above and below the channels. It will be evident, from Fig. 1 in particular, that the center of gravity of the harrow lies approximately in a plane intermediate the gangs of discs and generally between the channels 40. The channels may be regarded as a mounting member or portion for the implement passing substantially through said center of gravity. Washer plates 43 are slidably fitted over the threaded ends of the legs, and nuts 44 are screw-threadably turned on the legs against the washer plates.

A coupling or mounting device as provided by the present invention is generally indicated by the numeral 46 in Figs. 1 and 2. A substantially horizontally disposed outer draft frame 47 provides a pair of laterally spaced, parallel draft arms 48 having forward bifurcated ends 49 pivotally connected to the lower ends of the side bars 29 of the lift frame 25. For this purpose, pins 50 are extended through the forward ends of the draft arms and selected holes 39 in the lift frame, as best seen in Figs. 2 and 3. With particular reference to Fig. 1, the draft frame is seen to include forward and rearward transversely extended rigid struts 52, and a pair of rigid intersecting braces 53 all of which extend between the draft arms. Inner lugs 55 extend rearwardly from the rear strut in closely adjacent spaced relation to the draft arms 48, and outer lugs 56 are secured to the rearward ends of the draft arms and extend upwardly in adjacent spaced relation to the draft arms. An elongated angle-shaped guide member 58 rigidly, transversely interconnects the rearward ends of the draft arms and provides a substantially vertical flange 59 and a horizontal flange 60.

An inner hitch frame 65 provides hitch arms 66 having forward ends 67 individually fitted between adjacent draft arms 48 and inner lugs 55 and pivotally connected to the draft frame by pins 68. The hitch arms are rearwardly convergent and have reversely bent rear ends 69 defining elongated, vertically disposed slots 70. A flat plate 71 rigidly interconnects the rear ends of the arms. It will be evident that the hitch frame is pivotally connected to the draft frame for elevationally adjustable movement. Vertically disposed U-bolts 72 have legs extended upwardly on opposite sides of the channel 40 associated with the front gang 38 and also extended through the slots in the hitch arms. Washer plates 73 are slidably fitted downwardly on the ends of the U-bolts above the hitch arms, and nuts 74 are screw-threadably turned on the legs of the bolts for rigidly connecting the harrow 37 to the hitch frame 65. As shown in dashed line in Fig. 1, a fulcrum pin 75 is positioned between the framed gangs 38 and 39 intermediate the hitch arms 66. By removing the spacer blocks 41 and adjusting the nuts 44 on the U-bolts 42, the angularity and relative cutting action of the forward and rearward gangs can be adjusted. This augments the adjustment made possible by loosening the nuts 74 and moving the bolts 72 correspondingly or dissimilarly forwardly or rearwardly relative to the hitch arms 66.

Slide rods 77 provide lower ends 78 individually rigidly connected to the hitch arms 66 adjacent to the rear ends 69 thereof, as best seen in Fig. 4. The slide rods have upper threaded ends 79 slidably upwardly extended through the horizontal flange 60 of the guide member 58 in the draft frame 47. Compression springs 80 encircle the upwardly extended ends of the slide rods and rest on the horizontal flange 60. Stop washers 81 are fitted over the upper ends of the rods and are rested on the springs. Nuts 82 are screw-threaded on the rods against the washers thereby to enable adjustments in the compression of the springs. Collars 83 are secured to the slide rods below the flange 60 of the guide members 58 and limit upward sliding movement of the rods, as is best understood by reference to Fig. 5.

An inclined, generally A-shaped, tie frame 85 provides a threaded apex rod 86, side arms 87 downwardly outwardly converging from the apex rod having lower ends 88 fitted between the outer lugs 56 and the draft arms 48 and pivotally connected to the draft frame by pins 89. A transverse bar 90 interconnects the side arms in rigid relation therebetween.

An obtuse control lever 95 includes a pair of spaced parallel plates 96 having lower ends 97 extended between the center plates 26 of the lift frame 25 and pivotally connected thereto by a lower pin 98. The plates 96 extend upwardly on opposite sides of the apex rod 86, and a slide bushing 99 transversely slidably fitted on the apex rod is axially journaled between the plates. The control lever provides an upper end 100 extended above the apex rod and an upper threaded bushing 102 is axially journaled betwen the plates at their upper ends. A lower spring 105 encircles the apex rod and provides opposite ends bearing against the side arms 87 of the tie frame 85 and the slide bushing 99. An upper spring 106 encircles the apex rod above the control lever, and a stop nut 107 screw-threaded on the apex rod urges the upper spring against the slide bushing.

A sleeve 115 is journaled between the upper ends of the center plates 26 of the lift frame 25, and a crank 116 provides an elongated shaft 117 rotatably fitted transversely through the sleeve. Collars 118 are secured to the shaft on opposite sides of the sleeve to prevent axial movement of the shaft in the sleeve. The shaft has a threaded end 119 transversely screw-threaded in the upper threaded bushing 102. The crank 116 provides a handle 120. It will be evident that rotation of the shaft slides the bushing 99 upwardly and downwardly on the apex rod for urging the tie frame 85 upwardly and downwardly thereby to urge the draft frame 47 downwardly or to relieve such downward urgence and, if desired, exert a lifting effect.

It is to be noted that the lift frame 25, the draft frame 47, the tie frame 85, the control lever 95, and the handle 116 constitute an elevationally skewable, substantially triangularly shaped, support frame with the lift frame constituting an upright element of the triangle; the draft frame constituting a base or horizontal element of the triangle; and with the tie frame, lever, and handle constituting an hypotenuse element or linkage for the triangle. Such hypotenuse linkage is longitudinally adjustable and yieldably resists movement of the extended ends of the upright and base elements of the triangle toward and away from each other.

*Operation*

The operation of the first form of the present invention is believed to be readily apparent and is briefly summarized at this point. The harrow 37 is connected to the hitch frame 65 by extending the vertical U-bolts 72 upwardly through the slots 70, by placing the washer plates 73 over the bolts, and by securing the nuts 74 against the plates. It is to be noted that the hitch arms 66 can be longitudinally adjusted relative to the implement.

The handle 116 is turned to move the control lever 95 downwardly or upwardly on the apex rod 86, as operating conditions suggest. This urges the draft frame 47 downwardly by increasing the compression on spring 105 and by decreasing the compression on spring 106 or urges the draft frame upwardly by increasing the compression on spring 106 and decreasing the compression on spring 105. In this manner the relative depths at which it is desired to operate the forward and rearward gangs is adjustable to regulate their respective depths of soil engagement and side drafts incident thereto.

The tractor 12 is motivated to draw the harrow 37 over the ground. The harrow is provided with floating support since the hitch frame 65 is free to pivot upwardly and downwardly relative to the draft frame 47 and on the pivot pins 68. During normal operation, the weight of the harrow holds the springs 80 under compression. If the harrow encounters uneven terrain, or the like, the hitch frame pivots upwardly and/or downwardly without imposing undue shock or strain on the draft frame. If only one side of the harrow travels over a rise or a depression in the ground, the hitch arms 66 have sufficient torsional flexibility to permit such side to rise or fall independently of the other side of the harrow within narrow limits adequate for the purpose. This is in contrast to hitch structures of the prior art which rigidly mount implements thereon whereby rise of only one portion of the implement causes the entire implement to rise and places excessive strain on the implement, connection and tractor.

The harrow 37 can be elevated on the tractor 12 for transporting purposes by raising the lift arms 15, as is well-known. The present invention offers another advantage when lowering the harrow for ground engagement inasmuch as the shock frequently resulting when the harrow strikes the ground is not transmitted directly to the draft frame 47 but rather is absorbed by the springs 80.

*Second form*

The second form of the present invention is shown in association with the tractor 12 including the transmission housing 13, axle 14, the lift arms 15, and the upper control link 16, all as best seen in Fig. 6. The control link is pivotally connected to the plunger 17 and the spring 19 urges the plunger rearwardly. The arrangement shown with the second form of the present invention, however, is what is known as a four-point connection and thus includes a stabilizing link 150 having a forward end pivotally connected to the tractor and a rearwardly extended end. Also, a rock shaft 151, radius arms 152 rigidly extended from the rock shaft, and elevator rods 153 pivotally interconnecting the radius arms and the lift arms are shown.

The lift frame 25 is against provided including spaced parallel center plates 26. The lift frame is pivotally connected to the lift arms 15 and to the stabilizing link 150, and a shaft 158 extended between the center plates pivotally supports a fulcrum bar 159 having an upper forwardly extended end 160 pivotally connected to the control link 16 by means of a pin 161 and a lower end 162.

The disc harrow 37 is again provided for conveniently describing the second form of the invention. The harrow has an implement coupling device generally indicated by the numeral 170. The device has an outer draft frame 171 providing spaced, parallel draft arms 172 having bifurcated forward ends 173 pivotally connected to the side bars 29 of the lift frame 25 and rearwardly extended ends. A forward transverse bar 174 rigidly interconnects the forward ends of the draft arms. Inner front lugs 176 are extended upwardly from the draft arms, rear outer lugs 177 are extended upwardly at the rear ends of the draft arms, and inner lugs 178 are connected to the draft arms adjacent to their rear ends and extended upwardly in adjacent spaced relation to the arms. Front pendent links 180 are pivotally connected to the front flanges by pins 181.

A transversely angulated, elongated guide member 186 provides a horizontal flange 187, a vertical flange 188, and spaced end flanges 189. Trunnions 190 are extended endwardly from the end flanges and journaled for rotation in the rear upright lugs 177.

An inner hitch frame 195 provides a pair of hitch arms 196 having front ends 197 pivotally supported on the front links 180 by means of pins 198, rearwardly extended reversely bent ends 199 defining elongated slots 200, and a rear plate 201 rigidly interconnects the hitch arms. Cross braces 202 and a front strut 203 also rigidly interconnect the hitch arms. The vertically disposed U-bolts 72 are upwardly extended through the slots 200, and washer plates 73 are slidably fitted downwardly over the legs of the bolts against the hitch arms. Nuts 74 are screw-threadably turned downwardly on the bolts against the washer plates so as to secure the implement on the hitch frame.

Rear pendent links 210 are pivotally connected to the hitch arms 196 by lower pins 211. Slide rods 212 are rigidly upwardly extended from the rear links and have upper threaded ends 213 slidably extended upwardly through the horizontal flange 187 of the guide member 186. Coiled compression springs 214 encircle the upwardly extended ends of the slide rods. Stop washers 215 are fitted on the rods against the springs and nuts 216 are screw-threaded on the rods against the washers.

A push-pull rod 220 provides a forwardly disposed eye portion 221 pivotally connected to the lower end 162 of the fulcrum bar 159 by a pin 222 and a rear threaded end 223 extended through the transverse strut 203 and secured thereto by front and rear nuts 224.

A tie frame 230, upper and lower springs 231 and 232, a control lever 233 and a handle 235 are all provided as with the first form of the invention and are constructed and connected to the lift frame 25 and draft frame 171 in a manner believed to be understood.

*Operation of second form*

The initial elevation of the harrow 37 may be adjusted by turning the handle 235 in a manner similar to that explained for the handle 120. During normal operation, the springs 214 are held under compression by the harrow, and the drag of the harrow causes the rear links 210 and the slide rods 212 to be forwardly inclined, as indicated in dashed lines in Fig. 6. The drag thus causes the hitch frame 195 to swing rearwardly in the draft frame 171 so that the forward links 180 are also forwardly inclined.

If the harrow 37 encounters a ridge of dirt, unusually easily penetrated soil or for other cause the drag of the harrow is increased, the hitch frame 195 swings rearwardly to a greater extent. This pulls the rod 220 rearwardly, pivots the fulcrum bar 159 in a clockwise direction as viewed in Fig. 6, and shoves in on the control link 16 to move it forwardly. This operates the hydraulic lift control system of the tractor 12 to raise the lift arms 15 and thereby to raise the harrow. If the drag is reduced, the hitch frame swings forwardly under the urging of the springs 214 to relieve the inward pressure on the control link so that the lift arms are lowered.

The harrow 37 is mounted for elevationally adjustable movement in the draft frame 171 inasmuch as the hitch frame 195 can move up and down relative to the draft frame by slidable movement of the slide rods 212 in the guide member 186. The springs 214 function to cushion elevational movement of the hitch frame relative to the draft frame. It will be noted that such elevational movement is permitted whether the slide rods are upright or inclined. Further, the hitch arms 196 of the hitch frame have sufficient torsional flexibility to permit the opposite sides of the harrow to move up and down independently of each other to a limited degree.

*Third form*

A third form of the present invention is also adapted for use in connecting a disc harrow 37 to a lift frame 25 elevationally adjustably supported on lift arms 15 rearwardly extended from a tractor. A control link 16, a stabilizing link 150, and a fulcrum bar 159 are shown and are connected as previously noted.

Specifically, the mounting device, generally indicated at 250, includes an outer draft frame 251 providing a pair of spaced, parallel draft arms 252 having forward ends pivotally connected to the lift frame 25 and rearwardly extended ends. A front transverse bar 253 rigidly interconnects the forward ends of the draft arms. Inner front lugs 254 are rigidly downwardly extended from the draft arms, rear outer lugs 255 are rigidly upwardly extended from the draft arms in adjacent spaced relation to the arms, and upright flanges 256 are integrally upwardly extended from the draft arms in substantially coplanar relation therewith.

An elongated, transversely angular, guide member 260 rigidly transversely interconnects the upright flanges 256 and provides front and rear, downwardly divergent flanges 261 and 262 in substantially right angular relation to each other.

An inner hitch frame 266 provides a pair of spaced, parallel hitch arms 267 interconnected by angled, face-to-face front and rear struts 268 and 269. The hitch arms have laterally, inwardly offset, rearwardly extended portions 270 providing vertically disposed slots 271 adapted to receive the vertically extended U-bolts 72 in a manner now believed readily apparent. A rear plate 272 rigidly interconnects the hitch arms transversely of the arms. A push-pull rod 273 provides a rear end secured to the front strut by front and rear nuts 274 and a forward eye 275 pivotally connected to the lower end 162 of the fulcrum bar 159. Front support links 278 provide upper ends pivotally connected to the forward ends of the hitch arms and lower ends pivotally connected to the downwardly extended lugs 254.

Elongated, forwardly tilted slide rods 282 have lower ends 283 rigidly connected in laterally spaced relation to the rear strut 269 and upper ends 284 upwardly slidably extended through the front flange 261 of the guide member 260. Upper and lower washers 285 and 286, and upper and lower nuts 287 and 288 are respectively positioned on the upper and lower ends of the slide rods. Upper and lower coiled compression springs 289 and 290 encircle the slide rods on opposite sides of the guide plate and respectively bear against the guide plate and the upper and lower washers for yieldably resiliently resisting slidable movement of the rods relative to the guide plate. It will be evident that the hitch frame is mounted for forward and rearward swinging movement in the draft frame 251.

A tie frame 295 and a control lever 296 are provided and are of the identical construction as the tie frame 85 and control lever 95 already described.

*Operation of the third form*

The operation of the third form of the present invention is similar to the second form. It will be remembered that the slide rods 212 in Fig. 6 normally operate in forwardly inclined positions although erect when at rest. The slide rods 282, on the other hand, are rigidly mounted in forwardly inclined positions since such is their usual operable dispositions. Thus, as the harrow 37 is drawn over the ground, excessive drag swings the hitch frame 266 rearwardly to tilt the forward links 278 rearwardly and to slide the rods 282 downwardly and rearwardly placing upper spring 289 under greater compression. This moves the push-pull rod 273 rearwardly, and the control link 16 forwardly thereby to actuate the hydraulic control system of the tractor 12. This raises the harrow in a manner and for a purpose believed clearly understood. The forward and rearward swinging of the hitch frame, as a result of excessive drag or elevational movements of the harrow, is cushioned by the springs 289 and 290 bearing against the guide member 260.

From the foregoing, it will be understood that several coupling devices have been shown and described which are highly effective for mounting an implement for cushioned elevationally adjustable movement on a tractor. In all forms of the invention, the mounting arrangement enables the implement to conform to uneven terrain, obstacles, and soil conditions without imposing undue strain on the hitch, implement, or tractor. It has been found in practice, that the invention is excellently suited to the purposes for which it was intended and that the jars and jolts of sudden raising and lowering operations are accommodated with an absolute minimizing of wear, breakage and deterioration.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A device for mounting an agricultural implement for elevationally adjustable movement on a draft appliance comprising a substantially upright lift frame mounted on the appliance, a draft frame pivotally connected to the lift frame and rearwardly extended therefrom, forward links pivotally supported in the draft frame and downwardly extended therefrom, the draft frame including an elongated guide member extended transversely thereof and journaled for rotation rearwardly of the forward links, a hitch frame having a forward end portion pivotally supported on the forward links and a rearwardly extended portion connected to the implement, rear links pivotally connected to the hitch frame, slide rods having lower ends rigidly connected to the rear links and slidably upwardly extended through the guide member, stop members connected to the slide rods above the guide member, and coiled compression springs fitted over the slide rods between the stops and the guide member for yieldably resiliently resisting downward pivotal movement on the hitch frame relative to the draft frame.

2. In combination with a tractor having a pair of rearwardly extended lift arms mounted for elevational pivotal movement on the tractor, a lift frame mounted in substantially erect position on the extended ends of the lift arms, powered means for raising and lowering the lift arms, a control system connected to the powered means, a control link connected to the control system and mounted on the tractor for forward and rearward movement from a predetermined neutral position for automatically operating the powered means to raise the lift arms when moved forwardly of the neutral position and to lower the lift arms when moved rearwardly of the neutral position, a fulcrum bar mounted on the lift frame for pivotal movement around a substantially horizontal axis having an upwardly extended end pivotally connected to the control link and a downwardly extended lower end, and a rigid stabilizing link pivotally interconnecting the tractor and the lift frame in spaced substantially parallel relation to the lift arms; means for connecting an implement to the tractor for cushioned elevationally adjustable movement comprising a pair of draft arms having forward ends pivotally mounted on the lift frame and rearwardly extended ends, a guide member transversely extended across the rearwardly extended ends of the draft arms and journaled for rotation in the draft arms about an axis transversely thereof, forward pendent links pivotally connected to the draft arms adjacent to the forward ends of the arms, slide rods mounted for slidable movement in the guide member having ends upwardly and downwardly extended therefrom, rear pendent links having upper ends rigidly connected to the slide rods and lower ends, stop members secured to the upwardly extended ends of the slide rods in spaced relation to the guide member, coiled compression springs surrounding the rods having opposite ends respectively bearing against the stop members and the guide member, a hitch frame pivotally supported on the forward and rearward links for forward and rearward swinging movement relative to the draft arms and having a rearward end portion connected to the implement, a push-pull rod having a rear end rigidly connected to the hitch frame and a forward end pivotally connected to the lower end of the fulcrum bar for urging the control link forwardly incident to rearward swinging of the hitch frame and for urging the control link rearwardly incident to forward swinging of the hitch frame, and a linkage interconnecting the rearwardly extended ends of the draft arm and the lift frame in spaced relation to the draft arms for raising and lowering the draft arms on the lift frame.

3. A device for coupling an agricultural implement for cushioned, adjustable, elevational support on a draft appliance comprising a substantially erect lift frame mounted on the draft appliance, a pair of draft arms pivotally connected to the lift frame and having ends rearwardly extended therefrom, a guide member rigidly interconnecting the rearwardly extended ends of the draft arms, forward lugs secured to the draft arms and downwardly extended therefrom, a hitch frame having a rearward end portion secured to the implement, forward links having upper ends pivotally connected to the hitch frame and lower ends pivotally connected to the lugs, elongated slide rods having lower ends rigidly connected to the rearward end portion of the hitch frame and forwardly and upwardly extended therefrom in acute angular relation with the hitch frame and being slidably extended through the guide member, stop members secured to the slide rods on opposite sides of the guide member, coiled compression springs encircling the slide rods having lower ends bearing against the guide member and upper ends bearing against their respectively adjacent stop members for yieldably resiliently resisting movement of the slide rods in the guide member, and means connected to the lift frame in spaced relation to the draft arms and connected to the draft arms in spaced relation to the lift frame for raising and lowering the draft arms on the lift frame.

4. In combination with a tractor having a pair of rearwardly extended lift arms mounted for elevational pivotal movement on the tractor, a lift frame mounted in substantially erect position on the extended ends of the lift arms, powered means for raising and lowering the lift arms, a control system connected to the powered means, a control link connected to the control system and mounted on the tractor for forward and rearward movement from a predetermined neutral position for automatically operating the powered means to raise the lift arms when moved forwardly of the neutral position and to lower the lift arms when moved rearwardly of the neutral position, a fulcrum bar mounted on the lift frame for pivotal movement around a substantially horizontal axis having an upwardly extended end pivotally connected to the control link and a downwardly extended lower end, and a rigid stabilizing link pivotally interconnecting the tractor and the lift frame in spaced substantially parallel relation to the lift arms; means for connecting an implement to the tractor for cushioned elevationally adjustable movement comprising a pair of draft arms having forward ends pivotally mounted on the lift frame and rearwardly extended ends, a guide member transversely interconnecting the rearwardly extended ends of the draft arms, forward lugs downwardly extended from the forward ends of the draft arms, a hitch frame having a rearward end portion secured to the implement and a forwardly extended portion between the draft arms, links pivotally interconnecting the forwardly extended portion of the hitch frame and the lugs, forwardly inclined slide rods having lower ends rigidly connected to the rearward end portion of the hitch frame and upper ends slidably extended through the guide member whereby the hitch frame is swingable forwardly and rearwardly relative to the draft arms, coiled compression springs encircling the slide rods on opposite sides of the guide member, stop members adjustably connected to the slide rods and bearing against the springs for urging the springs toward the guide member, a push-pull rod having a rear end secured to the hitch frame and a forward end pivotally connected to the lower end of the fulcrum bar for moving the control link forwardly upon rearward swinging of the hitch frame and for moving the control link rearwardly upon forward swinging of the hitch frame, and a linkage interconnecting the rearwardly extended ends of the draft arms and the lift frame in spaced relation to the draft arms for raising and lowering the draft arms on the lift frame.

5. In combination with a draft appliance and an agricultural implement, a device for mounting the implement for resilient elevationally adjustable movement of the draft appliance comprising a draft arm connected to the draft appliance and rearwardly extended therefrom, a forward link pivotally supported on the draft arm and depending therefrom, a guide member journaled in the rearwardly extended portion of the draft arm and extended transversely thereof, a hitch arm having a forward end pivotally supported on the forward link and a rearwardly extended end, a rear link pivotally connected to the rearwardly extended end of the hitch arm, means mounting the implement on the rearwardly extended end of the hitch arm, a slide rod having a lower end rigidly connected to the rear link and an upper end upwardly slidably extended through the guide member, and means connected to the upper end of the rod and bearing against the guide member for resiliently yieldably resisting downward slidable movement of the rod and thereby counteracting the downward pivotal movement of the hitch arm relative to the draft arm.

6. A device for mounting an agricultural implement for elevational adjustable movement on a draft appliance comprising a draft frame adapted for connection to a draft appliance in a position rearwardly extended therefrom, forward links pivotally supported in the draft frame and downwardly extended therefrom, the draft frame including an elongated guide member extended transversely thereof and journaled for rotation in the frame rearwardly of the forward links, a hitch frame having a forward end portion pivotally supported on the forward links and a rearwardly extended portion adapted for connection to an implement, rear links pivotally connected to the hitch frame, slide rods having lower ends rigidly connected to the rear links and slidably upwardly extended through the guide member, stop members connected to the slide rods above the guide member, and coiled compression springs fitted over the slide rods between the stops and the guide member for yieldably resiliently resisting downward pivotal movement on the hitch frame relative to the draft frame.

7. In combination with a draft appliance and an agricultural implement, a device for coupling the implement for cushioned adjustable elevational support on the draft appliance comprising a draft arm connected to the appliance and rearwardly extended therefrom, a guide member rigidly connected to the rearwardly extended portion of the draft arm, a forward lug secured to the draft arm and downwardly extended therefrom, a hitch arm having a forward end portion and a rearward end portion, a forward link having an upper end pivotally connected to the forward end of the hitch arm and a lower end pivotally connected to the forward lug, means rigidly mounting the implement on the rearward end of the hitch arm so that the implement exerts a downward pressure tending to pivot the hitch arm downwardly with respect to the draft arm, a slide rod having a lower end rigidly connected to the rearward end of the hitch arm and forwardly and upwardly extended therefrom in acute angular relation with the hitch arm and slidably extended through the guide member, and means connected to the upwardly extended portion of the slide rod and bearing against the guide member for yieldably resiliently resisting downward movement of the slide rod with respect to the guide member and thereby resiliently to oppose said downward pivoting movement of the hitch arm.

8. A device for coupling an agricultural implement for cushioned adjustable elevational support on a draft appliance comprising a pair of draft arms connected to the draft appliance and having ends rearwardly extended therefrom, a guide member rigidly interconnecting the rearwardly extended ends of the draft arms, forward lugs secured to the draft arms and downwardly extended therefrom, a hitch frame having a rearward end portion secured to the implement, forward links having upper ends pivotally connected to the hitch frame and lower ends pivotally connected to the lugs, elongated slide rods having lower ends rigidly connected to the rearward end portion of the hitch frame and forwardly and upwardly extended therefrom in acute angular relation with the hitch frame and being slidably extended through the guide member, stop members secured to the upwardly extended ends of the slide rods, and coiled compression springs circumscribing the slide rods having lower ends bearing against the guide member and upper ends bearing against their respective stop members for yieldably resiliently resisting downward movement of the slide rods in the guide member.

9. In combination with an implement adapted for earth traversing movement in a predetermined path of travel having opposite sides, a center of gravity, and an elongated rigid mounting portion extended transversely of said path of travel and through said center of gravity, a device for mounting the implement for cushioned elevationally adjustable movement on a draft appliance during earth traversing movement of the appliance comprising a substantially horizontal draft frame having a forward end adapted to be connected to such an appliance and a rearward end adapted to be rearwardly extended from the appliance, a pair of longitudinally extended, transversely spaced rigid hitch arms having forward end portions pivotally connected to the draft frame intermediate the forward and rearward ends thereof for elevational pivotal movement and having rearwardly extended end portions, means rigidly connecting the rearwardly extended end portions of the hitch arms to the mounting portion of the implement in transversely spaced relation and respectively adjacent to opposite sides thereof with the implement rigidly interconnecting the hitch arms, the arms having sufficient torsional flexibility to permit lateral tilting of the implement from a substantially horizontal neutral positon during earth traversing movement, upwardly extended slide rods having lower ends connected to the hitch arms adjacent to their connection to the implement and upper ends slidably upwardly extended through the draft frame, stop members secured to the slide rods above the draft frame, and coiled compression springs encircling the slide rods and respecitvely bearing against the draft frame and the stop members for yieldably resiliently resisting downward pivotal movement of the implement relative to the draft frame and, although permitting said tilting movement, tending to maintain the implement in said neutral position.

10. In combination with an offset disc harrow having a center of gravity, adapted for earthworking engagement upon movement in a predetermined path of travel and including forward and rearward gangs of discs interconnected by a frame having an elongated mounting portion extended transversely of said path of travel between said gangs and substantially through the center of gravity of the harrow; an apparatus for mounting the harrow on a draft appliance comprising a pair of elongated transversely spaced draft arms having forward end portions adapted for connection to the draft appliance and rearwardly extended rear end portions; an elongated guide member transversely interconnecting the rear end portions of the draft arms, a pair of elongated transversely spaced hitch arms having forward ends individually pivotally connected to the draft arms between their forward and rear end portions and rear ends extended rearwardly beneath the guide member, means rigidly connecting the rear ends of the hitch arms in transversely spaced relation to the mounting portion of the harrow, and resilient means interconnecting the guide member and the hitch arms forwardly adjacent to the mounting portion of the harrow and supporting the harrow on the draft arms and the guide bar for elevationally floating movement but yieldably resiliently resisting downward movement of the harrow relative to the guide member.

11. The combination of claim 10 wherein said guide member is substantially horizontal and is rigidly connected to the hitch arms, and wherein said resilient means includes laterally spaced slide rods having lower ends individually rigidly connected to the hitch arms forwardly adjacent to the rear ends thereof, upwardly slidably extended through the guide member, and having upper ends above the guiding member, stop members secured to the slide rods above the guide member, and coiled compression springs encircling the slide rods above the guide member and having opposite ends respectively bearing against the guide member and the stop members.

12. In combination with an offset disc harrow having forward and rearward framed gangs of disc blades and a frame rigidly interconnecting the gangs in angular relation, the combination of a substantially erect lift frame in forwardly spaced relation to the forward gang adapted for connection to a tractor and for adjustable elevational movement with respect to the tractor while maintaining its substantially erect position, substantially parallel draft arms pivotally connected to the lift frame and rearwardly extended therefrom over the forward gang of the disc harrow and providing rearwardly extended ends, a pair of hitch arms individually pivotally connected to the draft arms intermediate the lift frame and the rearward ends of said draft arms and rearwardly extended therefrom for elevational movement relative to the draft arms, means rigidly connecting the frame of the harrow to the hitch arms at a position intermediate the gangs whereby as the hitch arms are elevationally pivoted on the draft arms the frame of the harrow is unitarily moved therewith, means resiliently supporting the hitch arms at positions rearwardly of their pivotal connection on the rearwardly extended ends of the draft arms, and elongated longitudinally resilient and adjustable means interconnecting the rearward end portions of the draft arms with the lift frame at a position above the draft arms whereby angularity of the draft arms with respect to the lift frame is adjustable.

13. The combination of claim 12 wherein said elongated longitudinally resilient and adjustable means includes an A-shaped tie frame having downwardly rearwardly divergent side arms individually pivotally connected to the rearwardly extended ends of the draft arms and meeting in an apex and an apex rod upwardly extended from said apex; a control lever having a lower end pivotally connected to the lift frame above the draft arms, an upper end, and being longitudinally slidably connected to the apex rod; a stop connected to the apex rod on the opposite side of the lever from said apex; coiled compression springs encircling the apex rod on opposite sides of the lever and respectively bearing against the stop and the lever and said apex and the lever; and a linkage longitudinally adjustably pivotally interconnecting the lift frame, above the pivotal connection of the lever to the frame, and the upper end of the lever.

References Cited in the file of this patent

UNITED STATES PATENTS

| 1,538,757 | Swindall | May 19, 1925 |
| 2,663,239 | Rapp et al. | Dec. 22, 1953 |
| 2,704,018 | Oehler et al. | Mar. 15, 1955 |
| 2,765,609 | Oehler et al. | Oct. 9, 1956 |

FOREIGN PATENTS

| 166,675 | Australia | Jan. 25, 1956 |